United States Patent [19]
Maruoka et al.

[11] Patent Number: 6,126,560
[45] Date of Patent: Oct. 3, 2000

[54] METHOD OF MAKING HOLLOW GOLF BALL

[75] Inventors: Kiyoto Maruoka, Kobe; Kazuo Hochi, Amagasaki; Akihiro Nakahara, Ibaraki, all of Japan

[73] Assignee: Sumitomo Rubber Industries, Ltd., Hyogo-ken, Japan

[21] Appl. No.: 09/354,909

[22] Filed: Jul. 16, 1999

[30] Foreign Application Priority Data

Jul. 17, 1998 [JP] Japan .................................. 10-203103

[51] Int. Cl.[7] .................................................. A63B 57/00
[52] U.S. Cl. .......................................... 473/409; 473/375
[58] Field of Search .................................. 473/351, 358, 473/354, 375, 409

[56] References Cited

U.S. PATENT DOCUMENTS

| | | | |
|---|---|---|---|
| 700,658 | 5/1902 | Kempshall | 473/375 |
| 704,748 | 7/1902 | Kempshall | 473/375 |
| 716,245 | 12/1902 | Kempshall | 473/358 |
| 736,232 | 8/1903 | Davis | 473/375 |
| 5,980,395 | 11/1999 | Tsunoda et al. | 473/373 |

FOREIGN PATENT DOCUMENTS

| | | |
|---|---|---|
| 846478 A1 | 6/1998 | European Pat. Off. . |
| 852156 A2 | 7/1998 | European Pat. Off. . |
| 63354 | 6/1991 | Japan . |
| 9-308709 | 12/1997 | Japan . |
| 2319481 | 5/1998 | United Kingdom . |

*Primary Examiner*—Jeanette Chapman
*Assistant Examiner*—Raeann Gordon

[57] ABSTRACT

A method of producing a hollow golf ball having excellent durability, which comprises a hollow portion with perfect spherical shape. The method of making a hollow golf ball having a hollow core composed of a hollow center having a hollow portion and optionally one or more intermediate core layers formed on the hollow center, and a cover formed on the hollow core, includes the steps of (a) preparing a rubber composition for the hollow center, (b) molding the rubber composition for the hollow center into a vulcanized semi-spherical half-shell, and (c) bonding the two vulcanized semi-spherical half-shells by placing an unvulcanized adhesive rubber composition between bonding surfaces of the two vulcanized semi-spherical half-shells, and vulcanizing it in a mold to form the hollow center, wherein the unvulcanized rubber composition has a $t_{90}$ time of 5 to 20 minutes, the $t_{90}$ time being a time for reaching 90% of a maximum torque, when the unvulcanized rubber composition is formed into a circular sample having a diameter of 43 mm and a thickness of 3 mm and then a torque is measured using a curastometer at a test temperature that is the same as a vulcanizing temperature.

5 Claims, 2 Drawing Sheets

METHOD OF MAKING HOLLOW GOLF BALL

FIELD OF THE INVENTION

The present invention relates to a method of producing a hollow golf ball. More particularly, it relates to a method of producing a hollow golf ball having excellent durability, which comprises a hollow portion with perfect spherical shape.

BACKGROUND OF THE INVENTION

Hitherto, there have been mainly produced two types of golf balls. The one is a solid golf ball, such as a two-piece golf ball or three-piece golf ball, and the other is a thread wound golf ball. The solid golf ball, when compared with the thread wound golf ball, has better durability and longer flight distance because of larger launch angle and smaller spin amount at the time of hitting. Therefore the solid golf ball is generally approved or employed by many golfers, mainly amateur golfers. In regard of enhancement of flight distance, the development of golf ball has been biased on the solid golf balls rather than the thread wound golf balls.

On the other hand, the solid golf ball exhibits hard and poor shot feel at the time of hitting. Solid golf balls having good shot feel have been recently proposed, but there is a drawback that rebound characteristics of the golf ball are degraded and the flight performance is reduced, because of softening of the ball.

In order to impart longer flight distance to the solid golf ball, a hollow core golf ball having a hollow core at its center has been proposed in Japanese Utility Model Publication No. 63354/1991. In the hollow golf ball, making the core hollow increased the moment of inertia, increases spin amount immediately after hitting, and reduces spin attenuation. It is proposed in Japanese Patent Kokai Publication No. 308709/1997 that a method of making the hollow golf ball comprises the steps of preparing a semi-spherical half-shell formed from rubber by press-molding or injection-molding using a male plug mold, and bonding two such semi-spherical half-shells by vulcanizing in a mold. However, the hollow portion is deformed by thermal expansion of the rubber during vulcanizing, and it is not perfectly spherical, thereby the thickness of the core is uneven. In case of using a hollow core formed by bonding two vulcanized semi-spherical half-shells with an adhesive and the like, the hollow core is cut from the adhesive surface, and the durability is much degraded, because the impact force when hitting by a golf club is very large.

SUMMARY OF THE INVENTION

A main object of the present invention is to provide a method of making a hollow golf ball having excellent durability comprising a hollow portion with a perfect spherical shape.

According to the present invention, the object described above has been accomplished by adjusting the $t_{90}$ time, which is a time for reaching 90% of a maximum torque, when the unvulcanized rubber composition is formed into a circular sample having a diameter of 43 mm and a thickness of 3 mm and then a torque is measured using a curastometer at a test temperature that is the same as a vulcanizing temperature of the unvulcanized rubber composition, to a specified range, in a method of making a hollow golf ball comprising the steps of bonding two vulcanized semi-spherical half-shells by placing the unvulcanized rubber composition between adhesion surfaces of the two vulcanized semi-spherical half-shells, and vulcanizing the unvulcanized rubber composition in a mold to form a hollow center, thereby providing a method of making a hollow golf ball having excellent durability, comprising a hollow portion that is perfect spherical shape.

This object as well as other objects and advantages of the present invention will become apparent to those skilled in the art from the following description with reference to the accompanying drawings.

BRIEF DESCRIPTION OF DRAWINGS

The present invention will become more fully understood from the detailed description given hereinbelow and the accomplishing drawings which are given by way of illustrating only, and thus are not limitative of the present invention, and wherein.

DETAILED DESCRIPTION OF THE INVENTION

Figure 1:
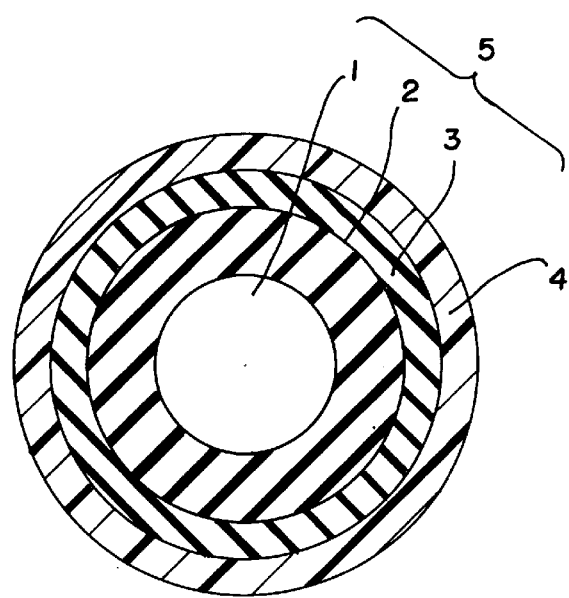
FIG. 1 is a schematic cross section illustrating one embodiment of the hollow golf ball of the present invention.

The hollow golf ball of the present invention will be explained in detail hereinafter with reference to the accompanying drawings. FIG. 1 is a schematic cross section illustrating one embodiment of the hollow golf ball of the present invention. The golf ball of the present invention comprises a hollow core 5 which is composed of a hollow center 2 having a hollow portion 1 and optionally one or more intermediate core layers 3, and a cover 4 formed on the hollow core.

Figure 2:
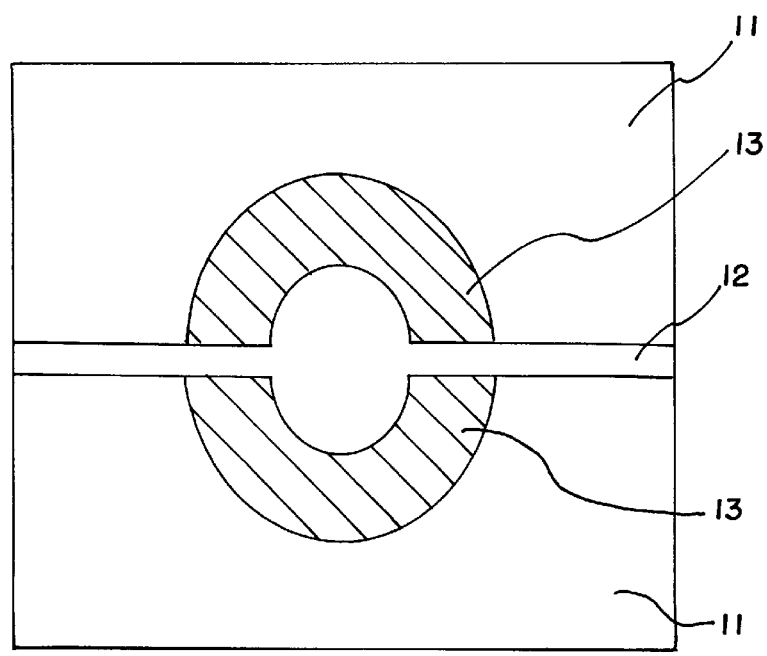
FIG. 2 is a schematic cross section illustrating one embodiment of the mold for molding the semi-spherical half-shell for the hollow center of the golf ball of the present invention.

The method of making the hollow golf ball of the present invention will also be explained in detail hereinafter with reference to the accompanying drawings. FIG. 2 is a schematic cross section illustrating one embodiment of the mold for molding the semi-spherical half-shell for the hollow center 2 of the golf ball of the present invention. The vulcanized semi-spherical half-shell 13 is formed by vulcanizing and press-molding the rubber composition for the hollow center using a mold having a semi-spherical cavity 11 and a male plug mold 12 having a semi-spherical convex plug shown in FIG. 2. The vulcanization may be conducted at 140 to 180° C., preferably 150 to 170° C. for 10 to 60 minutes, preferably 15 to 20 minutes. When the vulcanizing temperature is lower than 140° C., the vulcanizing time is long, and the productivity is degraded. On the other hand, when the vulcanizing temperature is higher than 180° C., the heat deterioration of the rubber occurs.

The rubber composition used in the hollow center 2 of the present invention typically comprises a base rubber, a co-crosslinking agent, a crosslinking agent, optionally a } filler and the like. The base rubber used for the hollow center 2 of the present invention may be natural rubber, synthetic rubber or mixture thereof, which has been conventionally used for solid golf balls. Examples of the synthetic rubbers include polybutadiene, polyisoprene, styrene-butadiene rubber, ethylene-propylene-diene rubber (EPDM), and the like. Preferred is high-cis polybutadiene rubber containing a cis-1, 4 bond of not less than 40%, preferably not less than 80%. It is desired that the base rubber is contained in the amount of not less than 70% by weight, preferably 90% by weight, based on the total rubber composition, in order to impart high rebound characteristics to the resulting golf ball.

The co-crosslinking agent used for the hollow center 2 of the present invention includes metal salt of unsaturated carboxylic acid, particularly mono or divalent metal salts, such as zinc or magnesium salts of α, β-unsaturated carboxylic acids having 3 to 8 carbon atoms (e.g. acrylic acid, methacrylic acid, etc.). Preferred is zinc acrylate because it imparts high rebound characteristics to the resulting golf ball. The amount of the co-crosslinking agent is from 15 to 50 parts by weight, preferably from 25 to 35 parts by weight, based on 100 parts by weight of the base rubber. When the amount of the co-crosslinking agent is larger than 50 parts by weight, the hollow center is too hard, and shot feel is poor. On the other hand, when the amount of the co-crosslinking agent is smaller than 15 parts by weight, the hollow center is too soft. Therefore the rebound characteristics are degraded, which reduces flight distance.

The crosslinking agent used for the hollow center 2 of the present invention includes organic peroxide, for example, dicumyl peroxide, 1,1-bis(t-butylperoxy)-3,3,5-trimethylcyclohexane, 2,5-dimethyl-2,5-di(t-butylperoxy) hexane, di-t-butyl peroxide and the like. Preferred is dicumyl peroxide. The amount of the crosslinking agent is from 0.1 to 3.0 parts by weight, preferably from 0.5 to 2.0 parts by weight, based on 100 parts by weight of the base rubber. When the amount of the crosslinking agent is smaller than 0.1 parts by weight, the hollow center is too soft. Therefore the rebound characteristics are degraded, which reduces flight distance. On the other hand, when the amount of the crosslinking agent is larger than 3.0 parts by weight, the hollow center is too hard, and shot feel is poor.

The filler used for the hollow center 2 of the present invention, which can be typically used for the core of golf ball, includes for example, an inorganic filler (such as zinc oxide, barium sulfate, calcium carbonate and the like), a high specific gravity metal powder filler (such as tungsten powder, molybdenum powder, and the like), and the mixture thereof. Since the hollow core employed in the present invention has lighter weight than a conventional solid core because of the presence of the hollow portion, a combination of the inorganic filler and the high specific gravity metal powder is preferable.

The rubber composition for the hollow center of the present invention can optionally contain other components, which have been conventionally used for preparing the core of solid golf balls, such as organic sulfide compounds, antioxidants or peptizing agents. If used, the amount of the antioxidant is preferably 0.2 to 0.5 parts by weight, based on 100 parts by weight of the base rubber.

Figure 3:
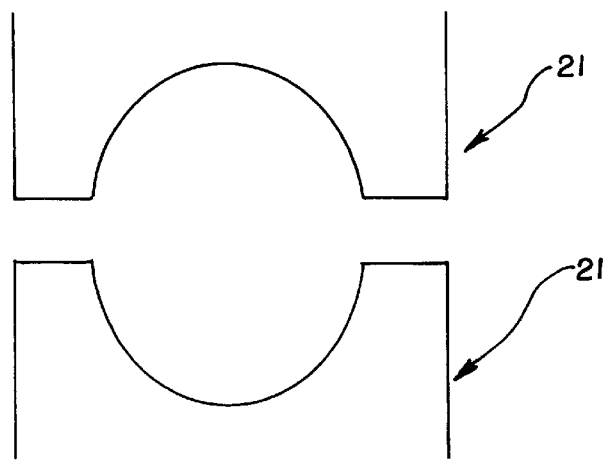
FIG. 3 is a schematic cross section illustrating one embodiment of the mold for molding the hollow center of the golf ball of the present invention.

An unvulcanized adhesive rubber composition is placed between bonding surfaces of the two vulcanized semi-spherical half-shells as described above, and the unvulcanized rubber composition is then vulcanized in two molds having a semi-spherical cavity 21 for molding the hollow center shown in FIG. 3 to form the hollow center 2. The mold having a semi-spherical cavity 21 for molding the hollow center may be the same as the mold having a semi-spherical cavity 11 for molding the semi-spherical half-shell or may be different from it. If it is different, when the inner diameter of the cavity of the mold having the semi-spherical cavity 21 for molding the hollow center is larger, there is a gap between the semi-spherical half-shell and the mold. Therefore, the vulcanization of the unvulcanized adhesive rubber composition is not sufficiently conducted because the heat conductivity is degraded, and the adhesion of the unvulcanized rubber composition is degraded because the pressure applied on the unvulcanized rubber composition is not sufficient. On the other hand, when the inner diameter of the cavity of the mold having the semi-spherical cavity 21 for molding the hollow center is smaller, the bonded semi-spherical half-shells are compressed when they are thermally expanded, and the hollow portion is deformed. Therefore the difference between the inner diameter of the cavity of the mold having the semi-spherical cavity 21 for molding the hollow center and that of the cavity of the mold having the semi-spherical cavity 11 for molding the semi-spherical half-shell is within the range of −0.02 to 0.02 mm, preferably—0.01 to 0.01 mm. It is optimal that the inner diameter of the cavity of the both molds is the same.

The semi-spherical half-shell after vulcanization is thermally expanded, but it is cooled and shrunk when the unvulcanized adhesive rubber composition is placed between the adhesive surfaces of the semi-spherical half-shells. Therefore there is a large gap between the semi-spherical half-shell and the mold, when the semi-spherical half-shell is put in the mold having the semi-spherical cavity 21 for molding the hollow center. When the vulcanization is conducted under the presence of the gap, the hollow center does not perfectly fit the cavity of the mold and the pressure is not applied on the whole of the hollow center. Therefore the adhesion between the semi-spherical half-shells is not sufficiently obtained, and the durability of the hollow center is much degraded. In order to obtain a sufficient adhesion by conducting the vulcanization of the unvulcanized adhesive rubber composition after the hollow center is thermally expanded and perfectly fits the cavity of the mold, it is desired to extend the vulcanizing time of the unvulcanized rubber composition.

Figure 4:
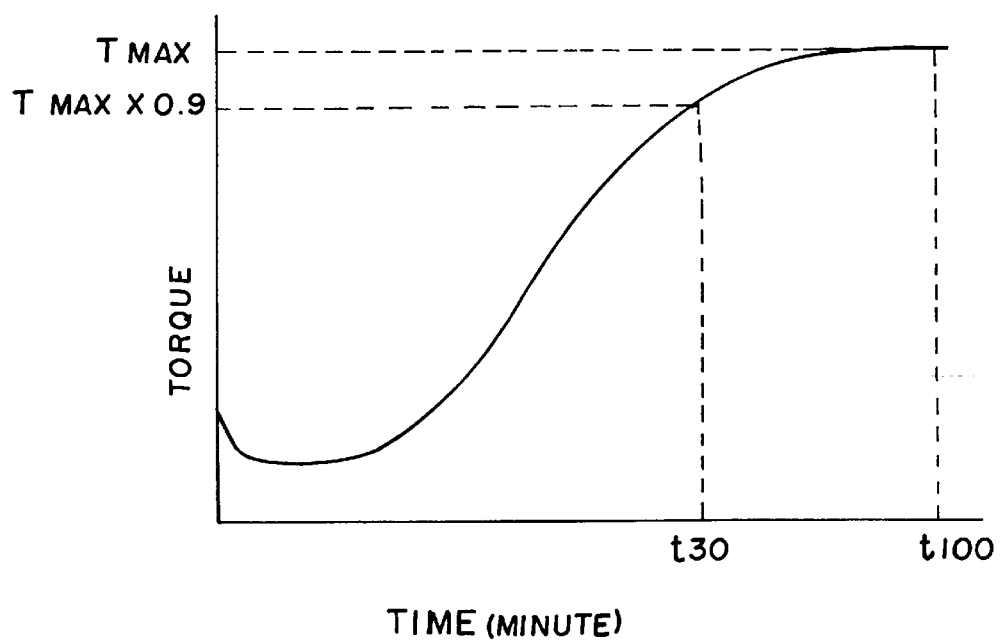
FIG. 4 is a graph illustrating a relation between a torque measured by a curastometer of the rubber composition for bonding the semi-spherical half-shells of the present invention and time.

For the reason, it is required that the unvulcanized adhesive rubber composition used in the present invention has a $t_{90}$ time of 5 to 20 minutes, preferably 10 to 15 minutes, which is a time for reaching 90% of a maximum torque, when a torque is measured using a curastometer. When the $t_{90}$ time is shorter than 5 minutes, the vulcanization of the unvulcanized rubber composition is conducted before the hollow center is sufficiently thermally expanded, and the adhesion is not sufficiently obtained. On the other hand, when the $t_{90}$ time is longer than 20 minutes, the productivity of the hollow center is degraded because it is required to extend the vulcanizing time. A method of determining the $t_{90}$ time is as follows. Change of torque, that is, stress responded to vibration applied on the sample with time is measured using a curastometer (JSR curastometer type III D manufactured by Orientech Co., Ltd.). The measurement by the curastometer is conducted at a testing temperature that is the vulcanizing temperature of the step (c), that is, the setting temperature of the mold for vulcanizing the hollow center, a sample size of 43 mm (diameter)×3 mm (thickness) and an angle of amplitude of ±1°, a period of 100 cpm (cycles per minute). FIG. 4 is a graph illustrating a relation of a torque measured using the curastometer from the unvulcanized state to the completely vulcanized state of the measured sample (rubber composition) with time. The larger the torque, the harder the rubber, because vulcanization is advanced. The torque gradually increases with the vulcanizing time, and the maximum torque value $T_{max}$ appears at the time $t_{100}$ when the vulcanization is completed. The time until the torque of the sample is reached 90% of the maximum torque $T_{max}$ is $t_{90}$.

When the vulcanizing time of the unvulcanized rubber composition for bonding the semi-spherical half-shells is longer than $t_{90}$, the vulcanization of the unvulcanized rubber composition is completed, and the adhesion of the semi-spherical half-shells is also completed. The difference between the vulcanizing time and $t_{90}$ is preset preferably not less than 2 minutes, more preferably not less than 4 minutes. When the difference between the vulcanizing time and $t_{90}$ is too larger, the vulcanizing time is too long, and the difference is preset preferably not more than 15 minutes, more preferably not more than 10 minutes. As the vulcanizing condition, the vulcanizing temperature is preferably 150 to 180° C., more preferably 150 to 170° C., and the vulcanizing time is preferably 10 to 30 minutes, more preferably 15 to 25 minutes. When the vulcanizing temperature is lower than 150° C., the vulcanizing time is long, and the productivity is degraded. On the other hand, when the vulcanizing temperature is higher than 180° C., the physical properties of the vulcanized rubber are degraded. When the vulcanizing time is shorter than 10 minutes, the formulation, which can be used for the unvulcanized rubber composition, is limited, and the cost of the rubber composition is high. On the other hand, when the vulcanizing time is longer than 30 minutes, the productivity is degraded.

In order to improve the adhesion, the two vulcanized semi-spherical half-shells may be bonded by placing an unvulcanized adhesive rubber composition between bonding surfaces of the two vulcanized semi-spherical half-shells, and heating the unvulcanized rubber composition at the temperature of 100 to 130° C., preferably 110 to 120° C., which is a temperature that the unvulcanized rubber composition can not be vulcanized, for not less than 2 minutes, preferably 3 to 5 minutes in a mold for molding the hollow center to thermally expand, before vulcanizing the unvulcanized rubber composition at the vulcanizing condition described above to form the hollow center 2.

The rubber composition used for bonding the semi-spherical half-shells is basically composed of the same material formulation as that of the rubber composition for the hollow center. However, when the amount of the organic peroxide is large, the vulcanizing velocity is large, and the adhesion is not sufficiently obtained. In order to extend the vulcanizing time of the unvulcanized rubber composition, a phenolic antioxidant or an organic sulfide compound may be added to the rubber composition. Examples of the antioxidants are not limited, but include "Noclac NS5", "Noclac NS6", which are commercially available from Ouchi Sinko Chemical Co., Ltd., and the like. Examples of the organic sulfide compounds are not limited, but include "Vulnoc R", which are commercially available from Ouchi Sinko Chemical Co., Ltd., and the like. The rubber composition used for bonding the semi-spherical half-shells suitably comprises 15 parts by weight of a co-crosslinking agent, 0.1 to 5.0 parts by weight of a crosslinking agent, 3 to 50 parts by weight of a filler and 0.1 to 5.0 parts by weight of an antioxidant, based on 100 parts by weight of a base rubber.

The rubber composition for bonding the semi-spherical half-shells used in the present invention is preferably used in the form of sheet or solution in an organic solvent in view of the durability of the resulting hollow center. It is preferred that the adhesive rubber composition is in the form of solution, in view of operability. The thickness of the unvulcanized rubber composition is 0.01 to 1.0 mm, preferably 0.1 to 0.5 mm. When the thickness is smaller than 0.01 mm, the adhesion is degraded. On the other hand, when the thickness is larger than 1.0 mm, the unvulcanized rubber composition flows into the hollow portion at the time of press molding. Therefore the moment of inertia is reduced, and the spin amount at the time of hitting is increased. The term "thickness of the unvulcanized rubber composition" as used herein refers to a thickness of a sheet when it is in the form of a sheet, and refers to a thickness after coating when it is in the form of a solution.

The shape of the semi-spherical half-shell is not limited to a shape that is divided the hollow center into two equal parts, but only one type of a mold is required to mold the semi-spherical half-shell when the semi-spherical half-shell has the above shape, and only one type of the semi-spherical half-shell is required to prepare the hollow center, thereby the productivity is improved. Therefore it is preferable that the semi-spherical half-shell has a shape that is divided the hollow center into two equal parts.

The hollow core 5 may be composed of only the hollow center 2, or may be composed of the hollow center and one or more intermediate core layers 3 formed on the hollow center. If used, the intermediate core layer 3 may be formed from the same rubber composition as the hollow center. Various adjustments for improving the shot feel and rebound characteristics of the resulting golf ball can be conducted, because the different rubber compositions can be used for the inner portion and the outer portion by forming the intermediate core layer 3 on the follow center. In addition, the hollow core composed of the hollow center and the intermediate core layer can have smaller thickness of the hollow center in comparison with the hollow core composed of only the hollow center, because the amount of expansion of the hollow center is increased with the thickness of the rubber composition of the hollow center. The technical effect of restraining the deformation of the hollow center and the hollow portion can be obtained, at the step of bonding the two vulcanized semi-spherical half-shells by placing an unvulcanized adhesive rubber composition between bonding surfaces of the two vulcanized semi-spherical half-shells, and vulcanizing the unvulcanized rubber composition in a mold to form the hollow center, in the method of making the hollow golf ball of the present invention. On the other hand, in case of the hollow core composed of only the hollow center, the productivity is excellent because the number of the manufacturing process is reduced.

The diameter of the hollow portion 1 is not limited, but is within the range of 8 to 20 mm, preferably 10 to 15 mm. When the diameter of the hollow portion is larger than 20 mm, the deformation amount of the resulting golf ball at the time of hitting is too large, the energy loss is large, and the rebound characteristics are degraded. In addition, it is necessary to formulate a large amount of filler to the core rubber layer for adjusting the specific gravity of the golf ball. Therefore the rebound characteristics are degraded, which reduces flight distance. On the other hand, when the diameter of the hollow portion is smaller than 8 mm, the effects accomplished by the presence of the hollow portion, that is, enhancement of moment of inertia and improvement of shot feel, are not sufficiently obtained.

The hollow center 2 has an outer diameter of 34 to 40 mm, preferably 37 to 39 mm. When the outer diameter of the hollow center 2 is smaller than 34 mm, the cover is thick, and the shot feel of the resulting golf ball is poor. In addition, the moment of inertia is reduced, because the specific gravity of the cover composition is typically small. On the other hand, when the outer diameter is larger than 40 mm, the cover is thin, and the rebound characteristics are degraded.

The thickness of the hollow core included that of the hollow center is within the range of not less than 4.0 mm, preferably 5.0 to 20 mm. When the thickness of the hollow core is smaller than 4.0 mm, the cover is too thick, or the diameter of the hollow portion is too large. When the cover is thick, the shot feel is poor. When the diameter of the hollow portion is large, the rebound characteristics are degraded as described above.

When the hollow core 5 is composed of the hollow center 2 and the intermediate core layer 3, the thickness of the hollow center is within the range of 3 to 15 mm, preferably 5 to 10 mm. When the thickness of the hollow center is smaller than 3 mm, the hollow center is easily deformed when forming the intermediate core layer on the hollow center. On the other hand, when the thickness of the hollow center is larger than 15 mm, the hollow center is easily deformed by thermal expansion of the rubber during vulcanizing the semi-spherical half-shells, and it is difficult to obtain a desired thickness of the hollow core or the cover layer because the rubber composition for adhesion easily flows into the hollow portion at the time of press molding, when bonding the vulcanized semi-spherical half-shells with the unvulcanized rubber composition and vulcanizing the unvulcanized rubber composition to form the hollow center.

The cover 4 is then covered on the hollow core 5. In the golf ball of the present invention, the cover may be formed from ionomer resin or balata, which has been conventionally used for the cover of solid golf balls, or may be suitably used in combination with a small amount of the other resin. The ionomer resin is an ethylene-(meth) acrylic acid copolymer, of which a portion of carboxylic acid groups is neutralized with metal ion, or mixtures thereof. The metal ion which neutralizes a portion of carboxylic acid groups of the copolymer includes an alkali metal ion, such as a sodium ion, a potassium ion, a lithium ion and the like; a divalent metal ion, such as a zinc ion, a calcium ion, a magnesium ion, and the like; a trivalent metal ion, such as an aluminum ion, a neodymium ion, and the like; and mixture thereof. Preferred are sodium ions, zinc ions, lithium ions and the like, in view of rebound characteristics, durability and the like. The ionomer resin is not limited, but examples thereof will be shown by a trade name thereof. Examples of the ionomer resins, which is commercially available from Mitsui Du Pont Polychemical Co., include Hi-milan 1557, Hi-milan 1605, Hi-milan 1652, Hi-milan 1705, Hi-milan 1706, Hi-milan 1707, Hi-milan 1855 and Hi-milan 1856. Examples of the ionomer resins, which are commercially available from Exxon Chemical Co., include Iotek 7010, Iotek 8000, and the like. These ionomer resins are used alone or in combination.

The cover composition used in the present invention may optionally contain fillers (such as barium sulfate, etc.), pigments (such as titanium dioxide, etc.), and the other additives such as a dispersant, an antioxidant, a UV absorber, a photostabilizer and a fluorescent agent or a fluorescent brightener, etc., in addition to the resin component, as long as the addition of the additive does not deteriorate the desired performance of the golf ball cover. However, the amount of the pigment is preferably from 0.1 to 5.0 parts by weight based on 100 parts by weight of the cover resin component.

The cover used in the present invention is formed by a conventional method for forming golf ball cover well known in the art, such as injection molding, press-molding and the like. At the time of molding the cover, many depressions called "dimples" may be optionally formed on the surface of the golf ball. Furthermore, paint finishing or marking with a stamp may be optionally provided after the cover is molded for commercial purposes. The paint is not limited. However, preferred is two-component urethane paint, because of good appearance and good wearability. The cover preferably has a thickness of 1.0 to 4.0 mm. When the thickness is smaller than 1.0 mm, the strength of the cover is not sufficient, and the durability of the resulting golf ball is degraded. Therefore the thickness is preferably not less than 1.5 mm. On the other hand, when the thickness is larger than 4.0 mm, the shot feel of the resulting golf ball is poor. Therefore the thickness is preferably not more than 3.0 mm. The cover may have single layer structure or multi-layer structure that has two or more layers.

EXAMPLES

The following Examples and Comparative Examples further illustrate the present invention in detail but are not to be construed to limit the scope thereof.

Examples 1 to 7 and Comparative Example 1

Production of Hollow Core

A vulcanized semi-spherical half-shell 13 was formed by mixing the following core rubber compositions having formulations shown in Table 1 with a mixing roll, and press-molding the mixture at 160° C. for 20 minutes using a mold having a semi-spherical cavity 11 and a male plug mold 12 having a semi-spherical convex plug shown in FIG. 2. The unvulcanized rubber compositions A to F for adhesion having formulations shown in Table 2 were placed between the adhesive surfaces of two semi-spherical half-shells. The unvulcanized rubber composition was then vulcanized and press-molded with the two semi-spherical half-shells in the two molds having a semi-spherical cavity shown in FIG. 3 to obtain a hollow center having a diameter of 38.4 mm. The $t_{90}$ of the unvulcanized adhesive rubber composition used was determined using a curastometer at a measuring temperature of 160° C., and the results are shown in Table 5. The test methods are described later. The diameter of the hollow portion of the resulting hollow center was measured, and for 20 minutes in the two molds having a semi-spherical cavity 21 for the hollow center shown in FIG. 3 to obtain a hollow center.

(II) The unvulcanized adhesive rubber composition was dissolved in naphtha to form a solution. The solution was applied to the adhesive surfaces of two semi-spherical half-shells. The unvulcanized rubber composition was vulcanized by press-molding the two semi-spherical half-shells at 160° C. for 20 minutes in the two molds having a semi-spherical cavity 21 for the hollow center shown in FIG. 3 to obtain a hollow center.

(III) The sheet having a thickness of 0.5 mm of the unvulcanized adhesive rubber composition was placed between the adhesive surfaces of two semi-spherical half-shells. The unvulcanized rubber composition was vulcanized by preheating at 130° C. for 5 minutes, and then press-molding at 160° C. for 20 minutes in the two molds having a semi-spherical cavity 21 for the hollow center shown in FIG. 3 to obtain a hollow center.

(IV) The unvulcanized adhesive rubber composition was dissolved in naphtha to form a solution. The solution was applied to the adhesive surfaces of two semi-spherical half-shells. The unvulcanized rubber composition was vulcanized by preheating at 130° C. for 5 minutes, and then press-molding at 160° C. for 20 minutes in the two molds the result is shown in Table 3. The method of preparing each hollow center described later. The hollow center was used as a hollow core.

TABLE 1

| Core composition | Amount (parts by weight) |
| --- | --- |
| BR-11 *1 | 100 |
| Zinc acrylate | 25 |
| Zinc oxide *2 | 36 |
| Dicumyl peroxide | 1 |

*1: High cis-1, 4-Polybutadiene (trade name "BR-11") available from JSR Co., Ltd. (Content of cis-1, 4-bond = 96%)
*2: Zinc oxide (trade name "Aenka No. 3") available from Toho Aen Co., Ltd.

Method of Preparing Hollow Center (I) The sheet having a thickness of 0.5 mm of the unvulcanized adhesive rubber composition was placed between the adhesive surfaces of two semi-spherical half-shells. The unvulcanized rubber composition was vulcanized by press-molding the two semi-spherical half-shells at 160° C. having a semi-spherical cavity 21 for the hollow center shown in FIG. 3 to obtain a hollow center.

TABLE 2

| Adhesive composition | (parts by weight) | | | | | |
| --- | --- | --- | --- | --- | --- | --- |
| | A | B | C | D | E | F |
| BR-11 *1 | 100 | 100 | 100 | 100 | 100 | 100 |
| Zinc acrylate | 25 | 25 | 25 | 25 | 25 | 25 |
| Zinc oxide *2 | 36 | 36 | 36 | 36 | 36 | 36 |
| Dicumyl peroxide | 2 | 2 | 2 | 2 | 2 | 2 |
| Noclac NS5 *3 | — | 0.5 | 1.0 | 2.0 | — | 0.5 |
| Vulnoc R *4 | — | — | — | — | 0.5 | — |

*1: High cis-1, 4-Polybutadiene (trade name "BR-11") available from JSR Co., Ltd. (Content of cis-1,4-bond = 96%)
*2: Zinc oxide (trade name "Aenka No. 3") available from Toho Aen Co., Ltd.
*3: Antioxidant (trade name "Noclac NS5") available from Ouchi Sinko Chemical Co., Ltd.
*4: Organic sulfate compound (trade name "Vulnoc R") available from Ouchi Sinko Chemical Co., Ltd.

Preparation of Cover Composition

The cover compositions having formulations shown in Table 3 were mixed using a kneading type twin-screw extruder to obtain a pelletized cover compositions. The extrusion conditions were a screw diameter of 45 mm, a screw speed of 200 rpm, and a screw L/D of 35.

The formulation materials were heated at 200 to 260° C. at the die position of the extruder.

TABLE 3

| Cover composition | Amount (parts by weight) |
| --- | --- |
| Hi-milan 1605 *5 | 50 |
| Hi-milan 1706 *6 | 50 |
| Titanium dioxide | 2 |

*5: Hi-milan 1605 (trade name), ethylene-methacrylic acid copolymer ionomer resin obtained by neutralizing with sodium ion, manufactured by Mitsui Du Pont Polychemical Co., Ltd.
*6: Hi-milan 1706 (trade name), ethylene-methacrylic acid copolymer ionomer resin obtained by neutralizing with zinc ion, manufactured by Mitsui Du Pont Polychemical Co., Ltd.

Production of Hollow Golf Ball

The cover composition was covered on the hollow core obtained as described above by injection-molding, followed by painting the surface with two-component urethane paint to obtain a hollow golf ball having a diameter of 42.9 mm and a weight of 45.3 g. The shape of the hollow portion and the durability of the resulting golf ball were measured or evaluated. The results are shown in Table 5 (Examples) and Table 6 (Comparative Examples). The test methods are described later.

Comparative Example 2

A semi-vulcanized semi-spherical half-shell was formed by mixing the rubber compositions having formulations shown in Table 1, and press-molding the mixture at 160° C. for 8 minutes using the mold having a semi-spherical cavity 11 and a male plug mold 12 having a semi-spherical convex plug shown in FIG. 2, followed by pulling out the male plug mold. The two semi-vulcanized semi-spherical half-shells were bonded by press-molding and vulcanizing at the same temperature as described above for 20 minutes in the two molds having a semi-spherical cavity to obtain a hollow center having a diameter of 15 mm. The diameter of hollow portion of the resulting hollow center was measured. The result is shown in Table 5. The hollow center was used as a hollow core. The cover composition having formulation shown in Table 3 was covered on the hollow core obtained as described above by injection-molding, followed by painting the surface with two-component urethane paint to obtain a hollow golf ball having a diameter of 42.9 mm and a weight of 45.3 g, as described in Examples 1 to 7 and Comparative Example 1. The shape of the hollow portion and durability of the resulting golf ball were measured or evaluated. The results are shown in Table 5. The test methods are described later.

Comparative Example 3

The rubber composition having a formulation shown in Table 4 was placed in the two molds having a semi-spherical cavity without using a male plug mold 12, and then vulcanized and press-molded at 160° C. for 20 minutes to obtain a spherical solid core of a diameter of 38.4 mm having no hollow portion. The cover composition having formulation shown in Table 3 was covered on the resulting core by injection-molding, followed by painting the surface with two-component urethane paint to obtain a solid golf ball having a diameter of 42.9 mm. The durability of the resulting solid golf ball was measured. The result is shown in Table 5. The test method is described later.

TABLE 4

| Core Composition | Amount (parts by weight) |
| --- | --- |
| BR-11 *1 | 100 |
| Zinc acrylate | 25 |
| Zinc oxide *2 | 22 |
| Dicumyl peroxide | 1 |

*1: High Cis-1, 4-Polybutadiene (trade name "BR-11") available from JSR Co., Ltd. (Content of cis-1,4-bond = 96%)
*2: Zinc oxide (trade name "Aenka No. 3") available from Toho Aen Co., Ltd.

Test Method (1) $t_{90}$

Change of stress, that is, torque responded to vibration applied on the sample with time is measured using a curastometer (JSR curastometer type III D manufactured by Orientech Co., Ltd.). The measurement by the curastometer is conducted at a testing temperature of 160° C., a sample size of 43 mm (diameter)×3 mm (thickness) and an angle of amplitude of ±1°, a period of 100 cpm (cycles per minute). FIG. 4 is a graphic illustrating a relation of a torque measured using the curastometer from the unvulcanized state to the completely vulcanized state of the measured sample (rubber composition) with time. The larger the torque, the harder the rubber, because vulcanization is advanced. The torque gradually increases with the vulcanizing time, and the maximum torque value $T_{max}$ appears at the time $t_{100}$ when the vulcanization is completed. The time until the torque of the sample is reached 90% of the maximum torque $T_{max}$ is $t_{90}$.

(2) Shape of Hollow Portion

After the golf ball was cut into two equal parts, the major axis and minor axis of the hollow portion are measured, and the average of difference between the two for every 100 samples (n=100) is obtained. Whether the shape of the hollow portion is perfect circle or not is evaluated by calculating the average of difference between the major axis and minor axis. The evaluation criteria are as follows.

(Evaluation Criteria)

○: The difference between the major axis and minor axis is not more than 1 mm.

Δ: The difference between the major axis and minor axis is less than 3 mm.

×: The difference between the major axis and minor axis is not less than 3 mm.

(3) Durability

After a driver was mount on a swing robot manufactured by True Temper Co. and the golf ball was hit at a head speed of 45 m/sec fifty times, for every 100 samples (n=100). The durability is the number of golf ball of which the cover has no cracks after hitting fifty times.

TABLE 5

| Test item | Example No. | | | | | | |
|---|---|---|---|---|---|---|---|
| | 1 | 2 | 3 | 4 | 5 | 6 | 7 |
| Unvulcanized rubber composition | B | C | E | B | F | D | N |
| $t_{90}$ (min) | 7 | 11 | 10 | 7 | 5 | 17 | 7 |
| Core molding method | I | I | I | II | I | I | IV |
| Diameter of hollow portion (mm) | 14.3 | 14.2 | 14.4 | 14.3 | 14.4 | 14.3 | 14.4 |
| Shape of hollow portion (number) ○ | 85 | 82 | 88 | 81 | 86 | 83 | 82 |
| Δ | 15 | 18 | 12 | 19 | 14 | 17 | 18 |
| × | 0 | 0 | 0 | 0 | 0 | 0 | 0 |
| Durability (number) | 100 | 100 | 100 | 93 | 100 | 100 | 100 |

TABLE 6

| Test item | Comparative Example No | | |
|---|---|---|---|
| | 1 | 2 | 3 |
| Unvulcanized rubber composition | A | — | — |
| $t_{90}$ (min) | 2 | — | — |
| Core molding method | III | — | — |
| Diameter of hollow portion (mm) | 14.3 | 12.5 | — |
| Shape of hollow portion (number) ○ | 85 | 30 | — |
| Δ | 15 | 45 | — |
| × | 0 | 25 | — |
| Durability (number) | 30 | 83 | 100 |

As is apparent from the results described above, the golf balls of the present invention of Examples 1 to 7, which are obtained by the method of the present invention, have a hollow portion that a perfect spherical shape, and excellent durability in comparison with the solid golf ball of Comparative Example 3.

On the other hand, in the golf ball of Comparative Example 1, the $t_{90}$ is small and the vulcanization of the unvulcanized rubber composition is advanced before the hollow center is sufficiently thermally expanded, because the unvulcanized adhesive rubber composition does not contain an organic sulfide compound and an antioxidant. Therefore the adhesion is sufficiently obtained, and the durability is much degraded.

In the golf ball of Comparative Example 2, the hollow center is deformed by the thermal expansion of the rubber composition for the hollow center, because the hollow center was formed by vulcanizing and press-molding the two preheated semi-spherical half-shells for the hollow center in the mold. Therefore the hollow portion has small diameter and is not perfect spherical.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. A method of making a hollow golf ball comprising a hollow core composed of a hollow center having a hollow portion and optionally one or more intermediate core layers formed on the hollow center, and a cover formed on the hollow core, comprising the steps of (a) preparing a rubber composition for the hollow center, (b) molding the rubber composition for the hollow center into a vulcanized semi-spherical half-shell, and (c) bonding two said vulcanized semi-spherical half-shells by placing an unvulcanized adhesive rubber composition between bonding surfaces of the two vulcanized semi-spherical half-shells, and vulcanizing it in a mold to form the hollow center, wherein the unvulcanized rubber composition has a $t_{90}$ time of 5 to 20 minutes, the $t_{90}$ time being a time for reaching 90% of a maximum torque, when the unvulcanized rubber composition is formed into a circular sample having a diameter of 43 mm and a thickness of 3 mm and torque is measured using a curastometer at a test temperature that is the same as a vulcanizing temperature.

2. The method of making the hollow golf ball according to claim 1, wherein the vulcanization in the step (c) is conducted at the vulcanizing time not less than the $t_{90}$ time.

3. The method of making the hollow golf ball according to claim 1, wherein the hollow portion has a diameter of 8 to 20 mm and the hollow center has a diameter of 36 to 39 mm.

4. The method of making the hollow golf ball according to claim 1, wherein the step (c) comprises the steps of (i) bonding the two vulcanized semi-spherical half-shells by placing an unvulcanized adhesive rubber composition between bonding surfaces of the two vulcanized semi-spherical half-shells, and heating the bonded half-shells at 100 to 130° C. for not less than 2 minutes in a mold to expand, and (ii) vulcanizing the unvulcanized rubber composition at 150 to 180° C. to form the hollow center.

5. The method of making the hollow golf ball according to claim 1, wherein the unvulcanized rubber composition is provided in the form of a sheet or solution in an organic solvent.

* * * * *